May 11, 1965 R. P. MONTESI 3,182,953
BALANCED BALL VALVE
Filed Oct. 30, 1961
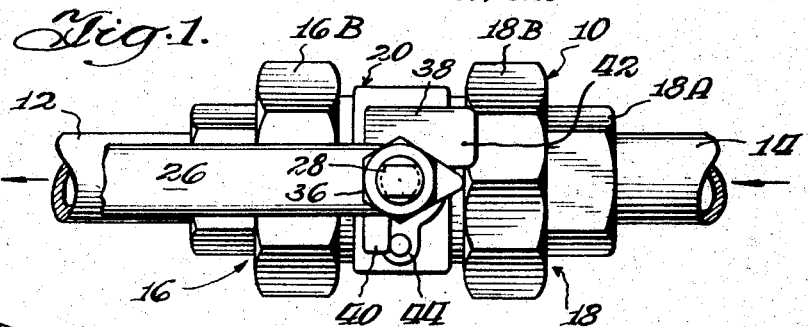
Fig. 1.
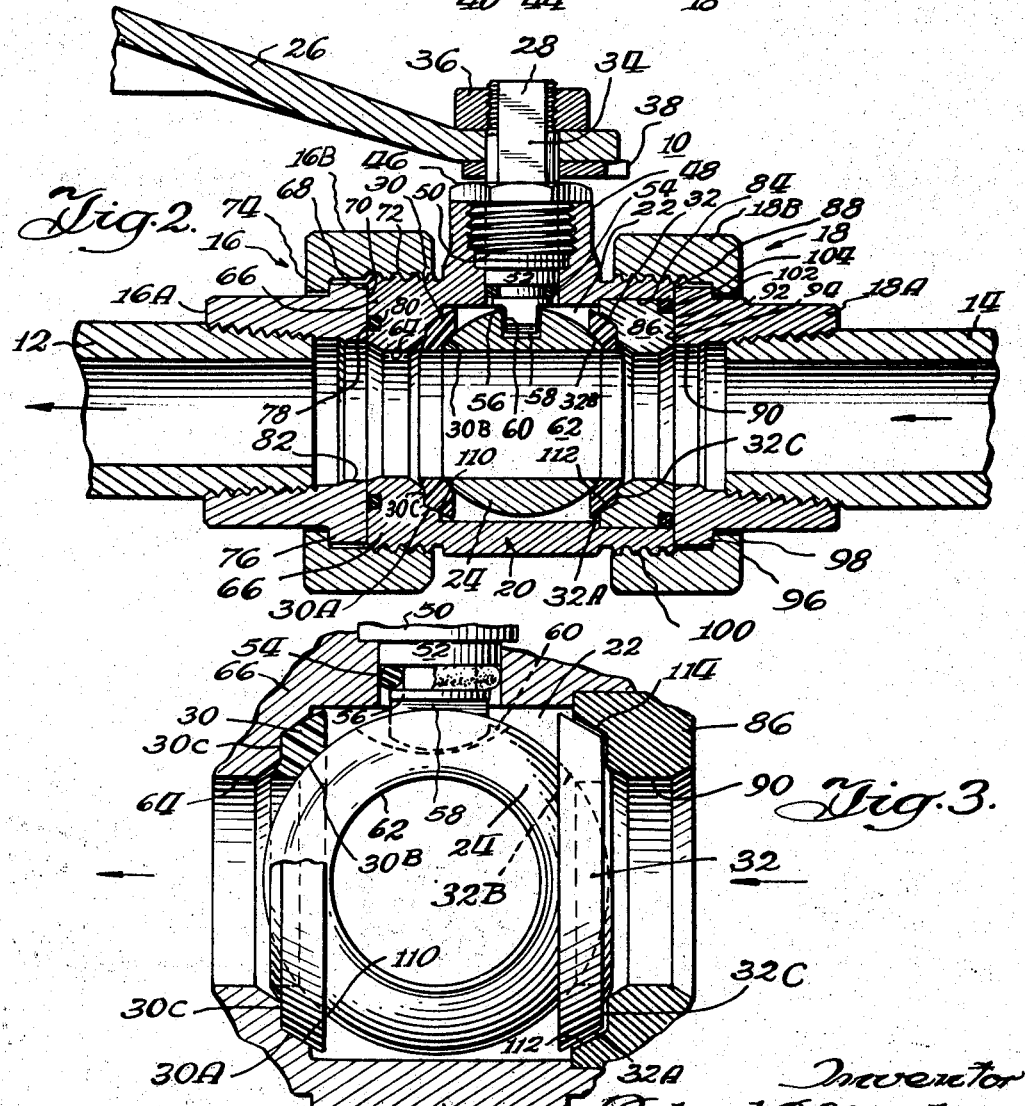
Fig. 2.
Fig. 3.
Inventor
Robert P. Montesi
By Mason, Kolehmainen, Rathburn & Wyss
Attorneys 3,182,953
BALANCED BALL VALVE
Robert P. Montesi, Chicago, Ill., assignor to Clayton Mark & Company, Evanston, Ill., a corporation of Delaware
Filed Oct. 30, 1961, Ser. No. 148,645
3 Claims. (Cl. 251—175)

The present invention relates to ball valves and has for its primary object the provision of a new and improved valve of this type.

A further object of the present invention is to provide a new and improved ball valve with upstream and downstream sealing means of which at least the upstream seal has a tapered surface engaging an adjacent tapered surface of the body and so constructed and arranged that when the valve is subjected to pressure the seal moves with the ball in a downstream direction whereby the tapered surfaces move apart and provide a passageway for pressure equalization at opposite sides of the upstream seal, thus to facilitate operation of the valve.

In brief, the valve of the present invention is provided with resilient sealing means at opposite ends of the body chamber, which sealing means are adapted to abut against the ball and are provided with tapered peripheral surfaces engaging complementary and adjacent tapered surfaces on the valve body, the arrangement being such that when the valve is in closed position the ball and upstream seal are movable downstream a slight distance, thereby to separate the tapered surfaces and thus provide a passageway around the upstream seal for pressure equalization at its opposite sides.

Other objects and advantages of the present invention will become apparent from the ensuing description of an illustrative embodiment thereof, in connection with which reference is had to the accompanying drawing, in which:

FIG. 1 is a top plan view of the valve of the present invention shown installed in a pipe line;

FIG. 2 is a longitudinal axial view through the valve with the valve in open position; and FIG. 3 is an enlarged fragmentary view similar to FIG. 2 with the valve in closed position.

Referring to the drawing, the valve as a whole is indicated by the reference character 10. It is shown installed in a pipe line including a pipe 12 and a pipe 14 of which the latter will be considered an inlet pipe and the former an outlet. Thus considered, the left end of the valve is the downstream and the right end is the upstream one.

The valve has union end assemblies 16 and 18 comprising the union ends 16A and 18A and the union nuts 16B and 18B and an intermediate valve body indicated as a whole by the reference character 20 within which is located a chamber 22 rotatably receiving a movable valve element or ball 24 adapted to be turned by means of a handle 26 and valve stem 28. This construction of the valve with union ends at both ends and other structural features are disclosed and claimed in my contemporaneously filed application Serial No. 148,644. Within the chamber 22 are the opposed seals 30 and 32, constructed and arranged in accordance with the present invention, as will be described hereinafter.

The stem includes a polygonal portion 34 to which the handle 26 is secured as by a lock nut 36. Also secured to the stem may be a position determining stop plate 38 having extensions 40 and 42 engageable with a stop pin 44 mounted on the body. The arrangement is such that the ball 24 is movable 90° between the open position shown in FIG. 2 and the closed position of FIG. 3. The valve stem is held in position by a nut 46 having external threads received in an internally threaded portion of an outwardly extending boss 48. The lower end of the nut bears against the end of a thrust washer 50 in turn bearing against a dual diameter flanged portion 52 of the valve stem. Below the portion 52 is a stem seal 54 bearing against another and somewhat smaller portion 56 on the stem.

The driving connection between the stem and ball is supplied by a tongue like portion 58 at the end of the stem received somewhat loosely in a groove 60 in the ball, the groove extending at right angles to the flow passage 62 in the ball 24.

In the open position of the valve, the ball flow passage 62 is aligned with a flow passage 64 in an integral end portion 66 of the valve body 20, the diameter of the flow passages 62 and 64 being substantially equal. The end portion 66 is provided with a planar end surface 68 abutted against a planar end surface 70 of the union end 16A. The end portion 66 is also provided with external threads 72 for cooperation with the internal threads on the union nut 16B. The latter has an inwardly extending flange 74 cooperating with an annular external flange 76 on the union end 16A whereby the parts are held detachably in assembled relation. A gasket 78 is placed in a groove 80 in the planar end 68 of the integral body portion 66 to seal the junction between the body and union end. The union end, it should be noted, is provided with an internal flow passage 82 somewhat larger in diameter than the flow passage 64 in the valve body and is internally threaded for reception of pipe 12.

The upstream end of the valve body has an axial opening 84 of a diameter somewhat greater than that of the ball in order that the ball may be placed in the body through it when the union end 18 is disassembled. The upstream end of the valve is provided a spacer 86 closely seating at its outer peripheral surface 88 in the body opening 84. The spacer has an internal passageway 90 corresponding in diameter to the flow passage 62 in the ball and a planar end surface 92 abutted aganist the planar end surface 94 of the union end 18A. The latter has an external peripheral flange 96 engaged by the inwardly extending flange 98 of the nut 18B when the latter has its internal threaded portion threaded onto the external thread portion 100 of the body.

The junction of the peripheral surface 88 and planar surface 92 of spacer 86 is provided with a groove 102 within which is disposed a gasket 104 having a diameter somewhat greater than the dimensions of the groove whereby when assembled as shown in FIG. 2 the gasket is compressed against the peripheral surface 88 of the body, the planar surface 94 of the union and against the spacer groove walls whereby leakage in a plurality of directions is prevented by the seal. Generally, the manufacturing tolerances should be such that the union end and spacer always abut.

In accordance with the present invention, the seals 30 and 32 are constructed with peripheral tapered surfaces 30A and 32A adjacent to complementary tapered surfaces 110 and 112 on the integral body portion 66 and spacer respectively. The tapered surfaces diverge outwardly and toward the axis of rotation of ball 24. The seals also have ball engaging surfaces 30B and 32B and planar body engaging surfaces 30C and 32C, respectively, which engage planar portions of the integral body portion 66 and spacer 86, respectively. With the valve in open position, the ball is held effectively centered and sealed by the seals 30 and 32, as illustrated in FIG. 2, which are made of some suitable resilient material such as Teflon, neoprene or the like. Under pressure, the ball is moved from the upstream to the downstream side, as illustrated in FIG. 3. When this occurs, the seal 30 is compressed somewhat and the seal 32 is moved downstream with the ball thereby to open an annular passageway 114 around what might be considered the outside of the seal. The result is equalization of pressure around the seal whereby closing of the valve is facilitated. The flow through the valve can be in the opposite direction, in which event seal 32 would be compressed and seal 32 would move downstream with the ball.

Operation of the ball is thus facilitated by the tapered construction of the seals and seats which provide at the upstream side of the valve in its closed position an annular flow passage 114 by means of which pressure at opposite sides of the seal 32 is equalized.

While the present invention has been illlustrated and described in connection with the details of a particular embodiment, it should be understood that such details are not intended to be limitative of the invention except insofar as set forth in the accompanying claims.

What is claimed as new and desired to be secured by Letters Patent of the United States is:

1. A valve, including in combination, a body having aligned flow passages, a rotatable ball valve element having a flow passage aligned with those in the body in open position and rotatable about an axis and movable downstream of the body in flow stopping position, a pair of spaced resilient seals for said ball each comprising a first surface engageable with the ball and surrounding the aligned flow passages in open position and a second and peripheral surface that is tapered in a direction diverging outwardly and toward the axis of rotation of the ball valve element, and said body having complementary tapered surfaces adjacent the tapered surfaces of the seals, the said tapered surfaces on the seal and body being in contact when the ball is in open flow permitting position and those on the upstream side separating when the ball is moved downstream by pressure against it in flow stopping position, whereby the separated surfaces provide an annular passage around the seal to equalize pressures at opposite sides of the upstream seal.

2. A valve, including in combination, a body having flow passage, a rotatable ball valve element having a flow passage aligned with that in the body in open position and rotatable about an axis and movable downstream of the body in flow stopping position, a seal for at least the upstream side of said ball comprising a first surface engageable with the ball and surrounding the aligned flow passages in open position, said seal having a second and peripheral surface that is tapered in a direction diverging outwardly and toward the axis of rotation of the ball valve element, and said body having a complementary tapered surface adjacent the tapered surface of the seal, the said tapered surfaces on the seal and body being in contact when the ball is in open flow permitting position and separating when the ball is moved downstream by pressure against it in flow stopping position, whereby the separated surfaces provide an annular passage around the seal to equalize pressures at opposite sides of the seal.

3. A valve as claimed in claim 1 in which said seals have planar radial end surfaces and the body has planar radial surfaces that are in engagement in the open position of the valve and wherein the upstream seal and body planar surfaces are separated when the ball is moved downstream by the pressure against it in flow stopping position.

References Cited by the Examiner
UNITED STATES PATENTS

| | | | |
|---|---|---|---|
| 2,930,576 | 3/60 | Sanctuary | 251—315 X |
| 3,056,577 | 10/62 | Kulisek | 251—315 |
| 3,096,786 | 7/63 | Rost | 251—315 X |

ISADOR WEIL, *Primary Examiner.*
WILLIAM F. O'DEA, *Examiner.*